(12) United States Patent
Hur

(10) Patent No.: US 6,490,941 B1
(45) Date of Patent: Dec. 10, 2002

(54) ELLIPTIC MOTION DRIVING APPARATUS FOR A STEP SCREEN

(76) Inventor: Sung Hur, Kyongbo Apt 2415, 581, Changjeon-Dong, Kumjung-Ku, Pusan (KR)

( * ) Notice: Subject to any disclaimer, the term of this patent is extended or adjusted under 35 U.S.C. 154(b) by 0 days.

(21) Appl. No.: 09/536,608

(22) Filed: Mar. 28, 2000

(51) Int. Cl.$^7$ .............................................. F16H 21/16
(52) U.S. Cl. ......................... 74/25; 198/750.8; 209/314
(58) Field of Search ............................... 74/25; 209/314, 209/309; 198/774.3, 775, 750.8

(56) References Cited

U.S. PATENT DOCUMENTS

| | | | | |
|---|---|---|---|---|
| 5,613,595 A | * | 3/1997 | Ukada ...................... | 198/774.3 |
| 5,653,633 A | * | 8/1997 | Kalverkamp et al. ....... | 460/114 |
| 5,904,254 A | * | 5/1999 | Tinsley et al. .............. | 209/314 |
| 6,177,020 B1 | * | 1/2001 | Wiesemann ................. | 210/780 |

* cited by examiner

*Primary Examiner*—David Fenstermacher
(74) *Attorney, Agent, or Firm*—Oblon, Spivak, McClelland, Maier & Neustadt, P.C.

(57) ABSTRACT

An elliptic motion driving apparatus for a step screen in which the elliptic motion of an elliptic motion driving unit is transferred to a driven link so as to make steep movable plates, connected by a movable column, perform elliptical movement in a longitudinal direction of the movable column, includes a driving rotation cam combined to a power transmission shaft rotating in linkage with a worm reduction gear of a driving motor, a horizontal motion eccentric shaft axially combined to the driving rotation cam so that a horizontal eccentric bearing of the horizontal motion eccentric shaft moves horizontally along a horizontal motion guiding rail, and a vertical motion eccentric shaft combined to the horizontal motion eccentric shaft through an eccentric rotation cam so that a vertical eccentric bearing of the vertical motion eccentric shaft moves vertically along a vertical motion guiding rail as the horizontal motion eccentric shaft rotates.

1 Claim, 14 Drawing Sheets

ELLIPTIC MOTION DRIVING APPARATUS FOR A STEP SCREEN

BACKGROUND OF THE INVENTION

1. Field of the Invention

The present invention relates to a step screen for conveying solid particles upwards and securely removing them from wastewater flowing through an aqueduct without any special restrictions in the installation condition, and more particularly to an elliptic motion driving apparatus for a step screen, which enables movable plates to move elliptically so that impurities in wastewater may be drawn and securely carried as they stand on each movable plate even though the step screen is installed at an inclination more than 45° to the ground of the aqueduct.

2. Description of the Related Art

Generally, a step screen is used to convey and eliminate adulterated things in wastewater flowing through a sewage aqueduct such as a sewage disposal plant or industrial wastewater disposal plant. To carry and remove impurities, the step screen has a plurality of lattice plates which are composed of toothed steps configured a set of stairs at a certain angle. The plates are classified into two types; movable and stationary plates, which are arranged in turn. A movable plate is elevated one step per one cycle so as to convey the caught impurities. Thus, the impurities are screened and conveyed without any dissipation or loss of disintegration from their initially filtered state.

FIG. 1 shows a conventional step screen installed with a common inclination of 45° on an aqueduct bottom 10, FIGS. 2 and 3 are front and side views of the conventional step screen, respectively. FIGS. 4 and 5 are a sectional view of a circular motion driving unit 50 and a side view of a driven link 60 for transferring circular motion of the circular motion driving unit 50 to a movable column 45 linked to movable plates 20.

As shown in the figures, the conventional step screen is commonly installed at 45° on the aqueduct bottom 10 through which wastewater passes. In the step screen, the movable columns 45 linked to both sides of the circular motion driving unit 50 along fixed frames 40 composing both sides of the screen may circularly move to a longitudinal direction. At the same time, the movable plates 20 arranged inside the fixed frames 40 perform circular movements so that impurities 70 (see FIG. 7) pushed upward onto the next steps of the stationary plates by movable plates 20 may be successively moved upward along the stationary plates by each circular turn of the movable pates.

In other words, the movable plates 20 perform circular movements so that the inclination of the steps of lattice plates (see FIG. 6) has an angle of about 45° to a horizontal level of the aqueduct bottom 10. For that reason, as an eccentric rotation cam 51 connected through a power transmission shaft 53 to a driving motor 65 at an upper portion of the screen rotates, the circular motion of the circular motion driving motor 50 is transferred to an eccentric shaft 52. The circular motion of the circular motion driving unit 50 also makes a driven link 60, axially connected to the eccentric shaft 52 through a link bar 61, move in a circular motion. At the same time, the corresponding longitudinal movable column 45 is moved circularly so that the movable plates 20 on the whole may perform in a regular circular motion between each pair of stationary plates 30.

As shown in FIG. 6, in the conventional step screen, the downward portion 21 of each toothed step 20 projected at the side view of the movable plates 20 is perpendicular. Thus, when the screen is inclined to a 45° angle to the aqueduct bottom 10, the movable plates 20 of the conventional step screen may push upward and convey impurities 70 in a stable manner while maintaining horizontally the terrace portion 22 of each toothed step 20, whose section is triangularly projected at the longitudinal side view of the movable plates 20, as shown in FIG. 7. However, if the screen is installed at an angle of more than 45°, the terrace portion 22 of each toothed step 20 inclines downward below the horizontal level. So there still remains a structural difficulty that the screen is not suitable for moving impurities 70 at a steep inclination.

In addition, the conventional step screen in which the movable plates 20 circularly moves at an inclination of 45° is effective only at an installation angle of 45° to the aqueduct bottom, which requires more setup space than a rake classifier (filter) with an installation angle of 75°. Even more, when the installation environment requires an incline of more than 45° to the screen, the construction design should be changed by a large degree.

Furthermore, the conventional screen supports the movable column 45 only at two points, namely top and bottom, in the circular motion of the movable plates 20. Thus, if there is a large screen requiring a long movable column 45 for a deep aqueduct, the allowable aqueduct depth is limited to 2.7M due to structural limitations. In addition, the method of driving the movable plates 20 in a circular motion also has the problem that the movable plates 20 cannot perform movement proper to push upward the impurities onto the next steps of the stationary when the toothed step is steeply inclined.

SUMMARY OF THE INVENTION

The present invention is designed to overcome the structural problems of the prior art caused by the circular motion of the movable plates which maintain a step angle of about 45°, and an object of the invention is to provide an elliptic motion driving apparatus for a step screen, in which the toothed steps of movable and stationary plates maintain an inclination over 45° even when the screen is installed at a steep incline of more than 45°, so that movable plates having such toothed steps may move elliptically to push upward and convey impurities in wastewater in a stable manner.

In order to accomplish the above object, the present invention provides an elliptic motion driving apparatus for a step screen in which the elliptic motion of an elliptic motion driving unit is transferred to a driven link so as to make steeper movable plates, connected by a movable column, rotate elliptically regularly in a longitudinal direction of the movable column, which includes a driving rotation cam, one end of which is combined to a power transmission shaft rotating in linkage with a worm reduction gear of a driving motor; an eccentric shaft for horizontal motion, axially combined to the other end of the driving rotation cam so that a horizontal eccentric bearing of the eccentric shaft for horizontal motion moves horizontally along a horizontal motion guiding rail as the driving rotation cam rotates; and an eccentric shaft for vertical motion combined to the eccentric shaft for horizontal motion through an eccentric rotation cam so that a vertical eccentric bearing of the eccentric shaft for vertical motion moves vertically along a vertical motion guiding rail as the eccentric shaft for horizontal motion rotates.

DETAILED DESCRIPTION OF THE PREFERRED EMBODIMENT

Hereinafter, a preferred embodiment of an elliptic steep-toothed step screen according to the present invention will be described in detail with reference to the accompanying drawings.

Figure 1:
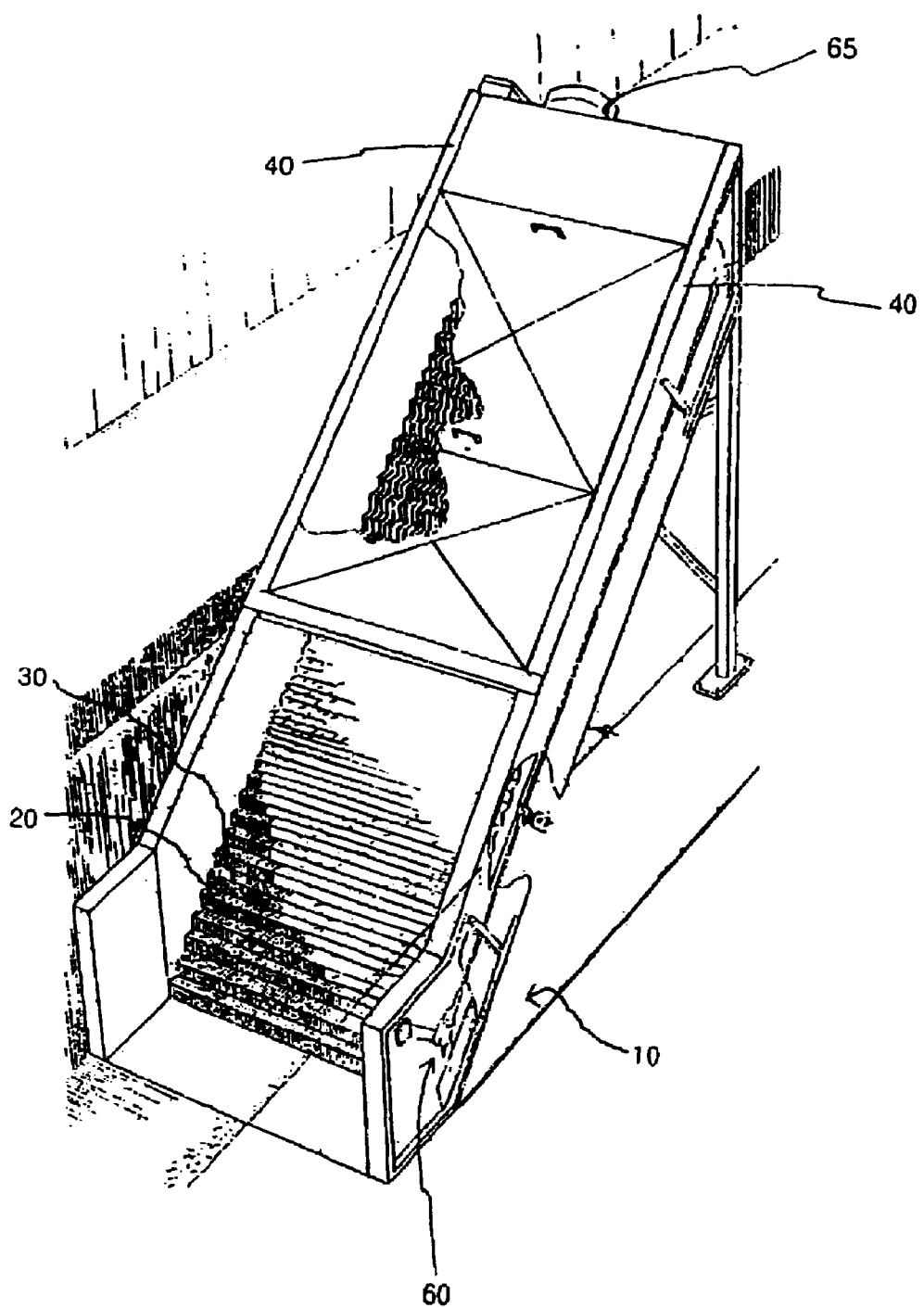
FIG. 1 is a perspective view showing a step screen according to the prior art.
Figure 2:
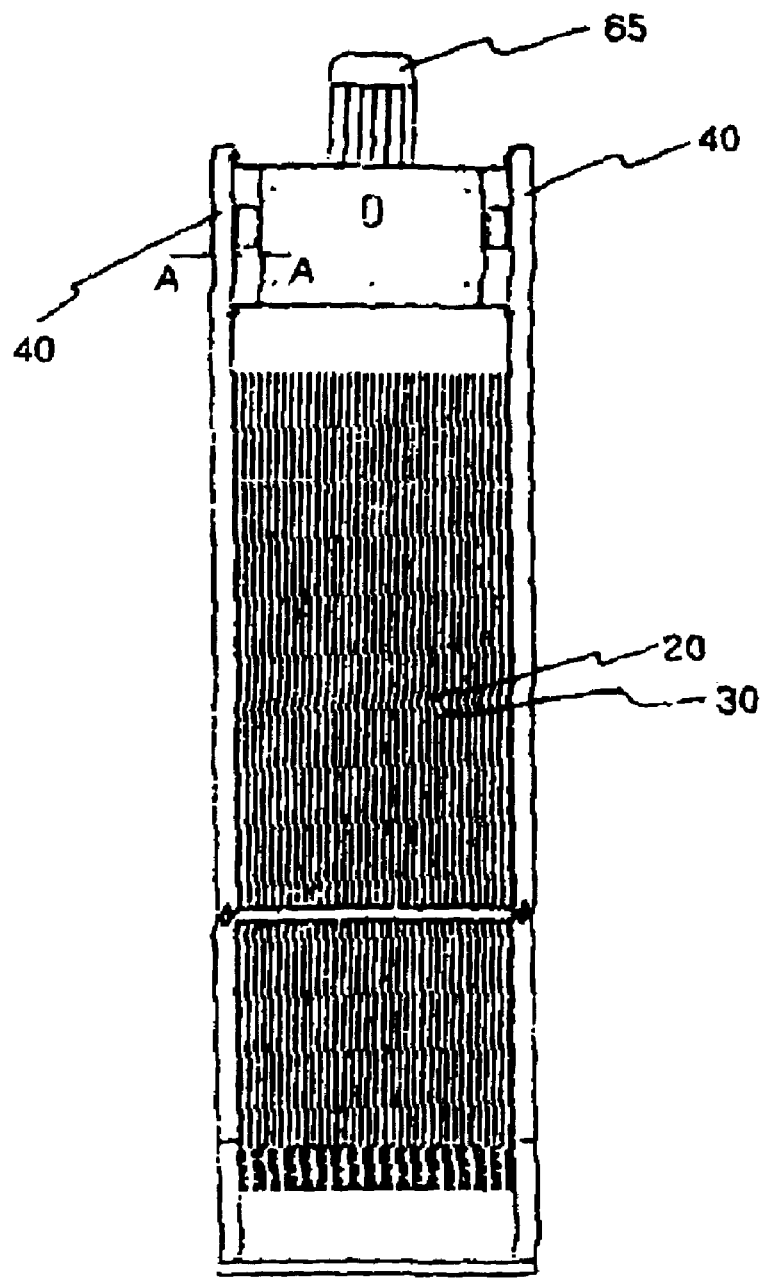
FIG. 2 is a front view of the step screen according to the prior art.
Figure 3:
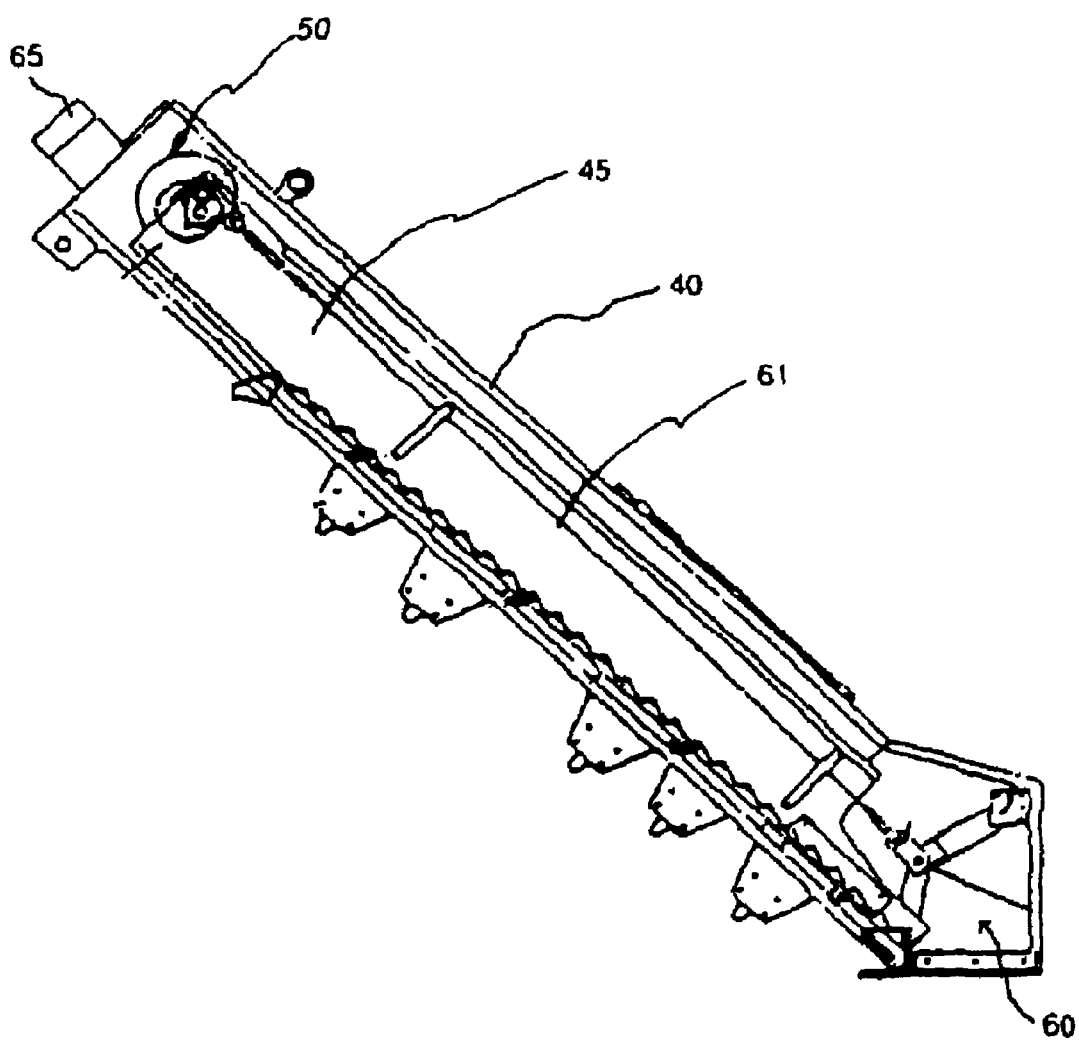
FIG. 3 is a side view of the step screen according to the prior art.
Figure 4:
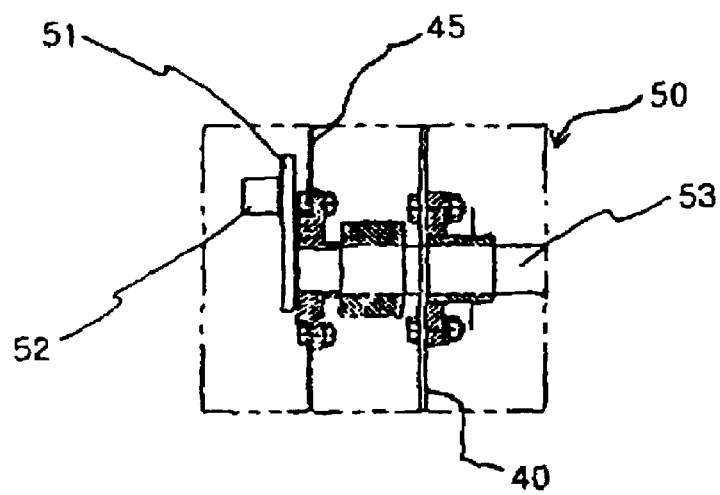
FIG. 4 is a sectional view taken along A—A line of FIG. 2 to show a circular motion driving unit of the step screen according to the prior art.
Figure 5:
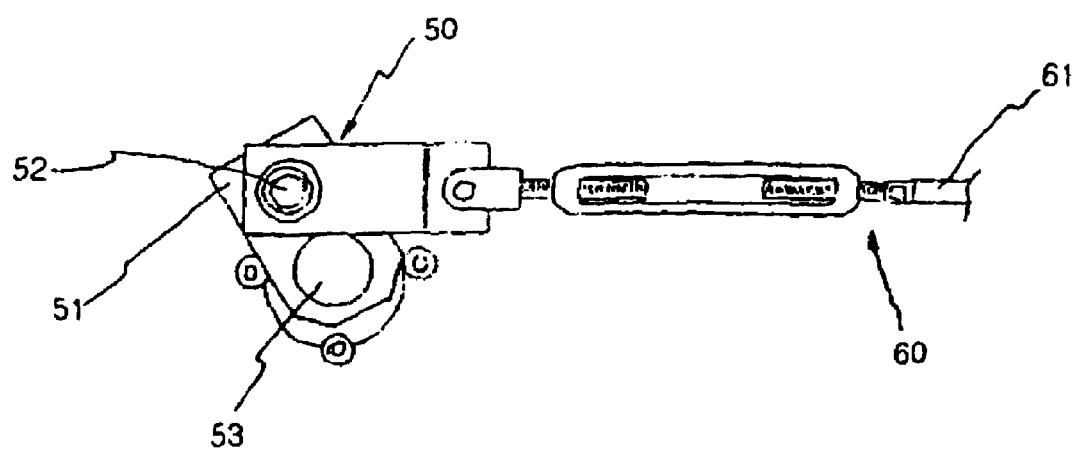
FIG. 5 shows a driven link of the step screen according to the prior art.
Figure 6:
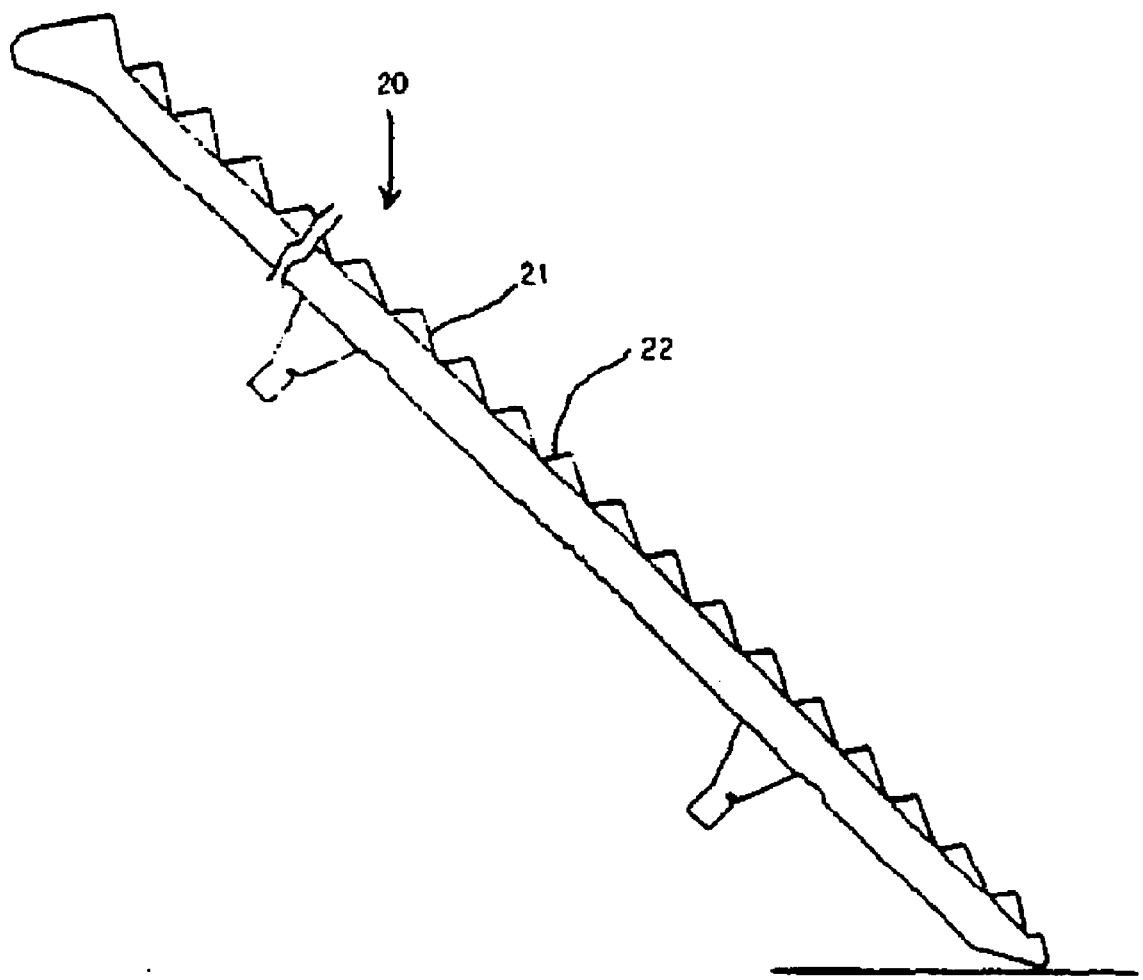
FIG. 6 is a side view showing a movable plate of the step screen according to the prior art.
Figure 7:
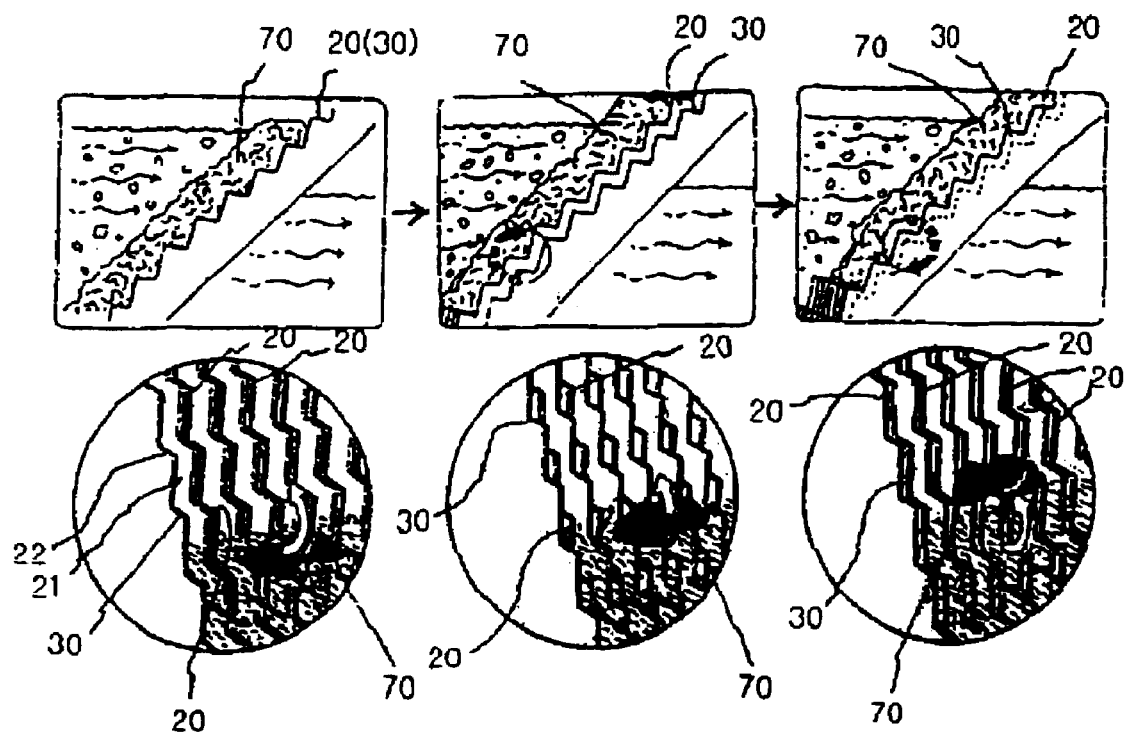
FIG. 7 shows impurities conveyed by the movable plates of the step screen according to the prior art.
Figure 8:
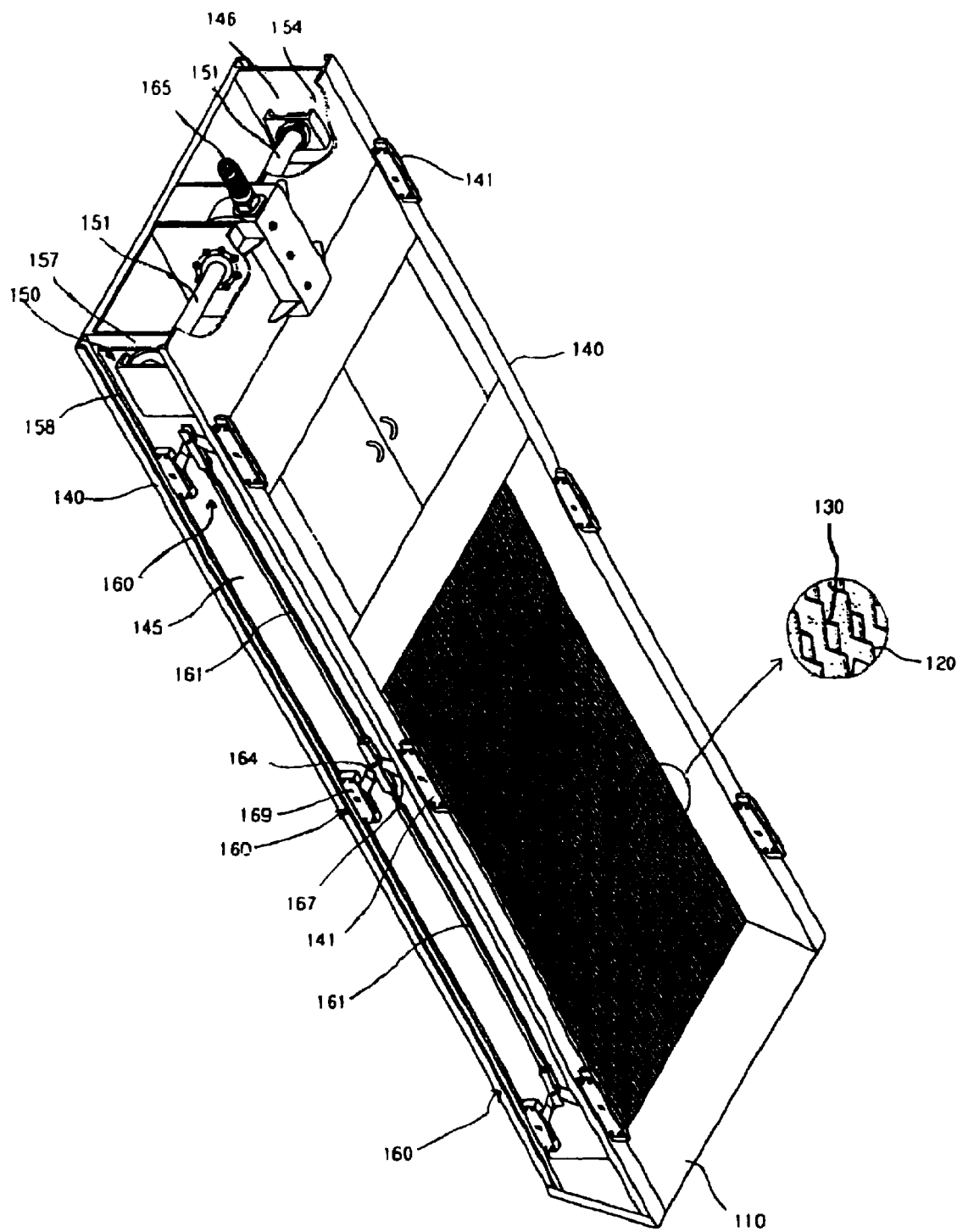
FIG. 8 is a perspective view showing a step screen with steep-toothed movable plates according to the present invention.
Figure 9:
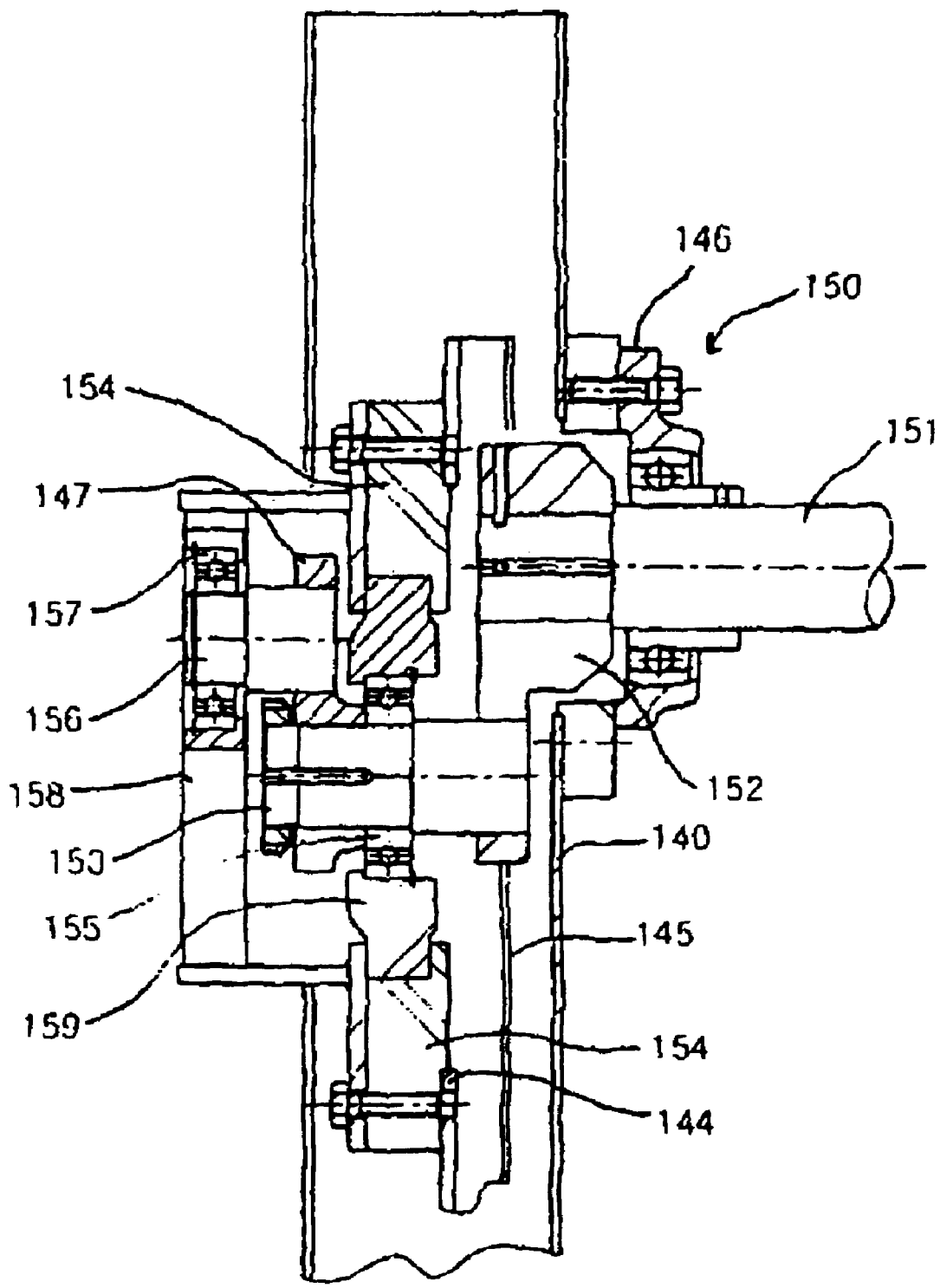
FIG. 9 is a sectional view showing an elliptic motion driving unit at an upper portion of the screen for elliptic motion of the movable plates of the present invention.
Figure 10:
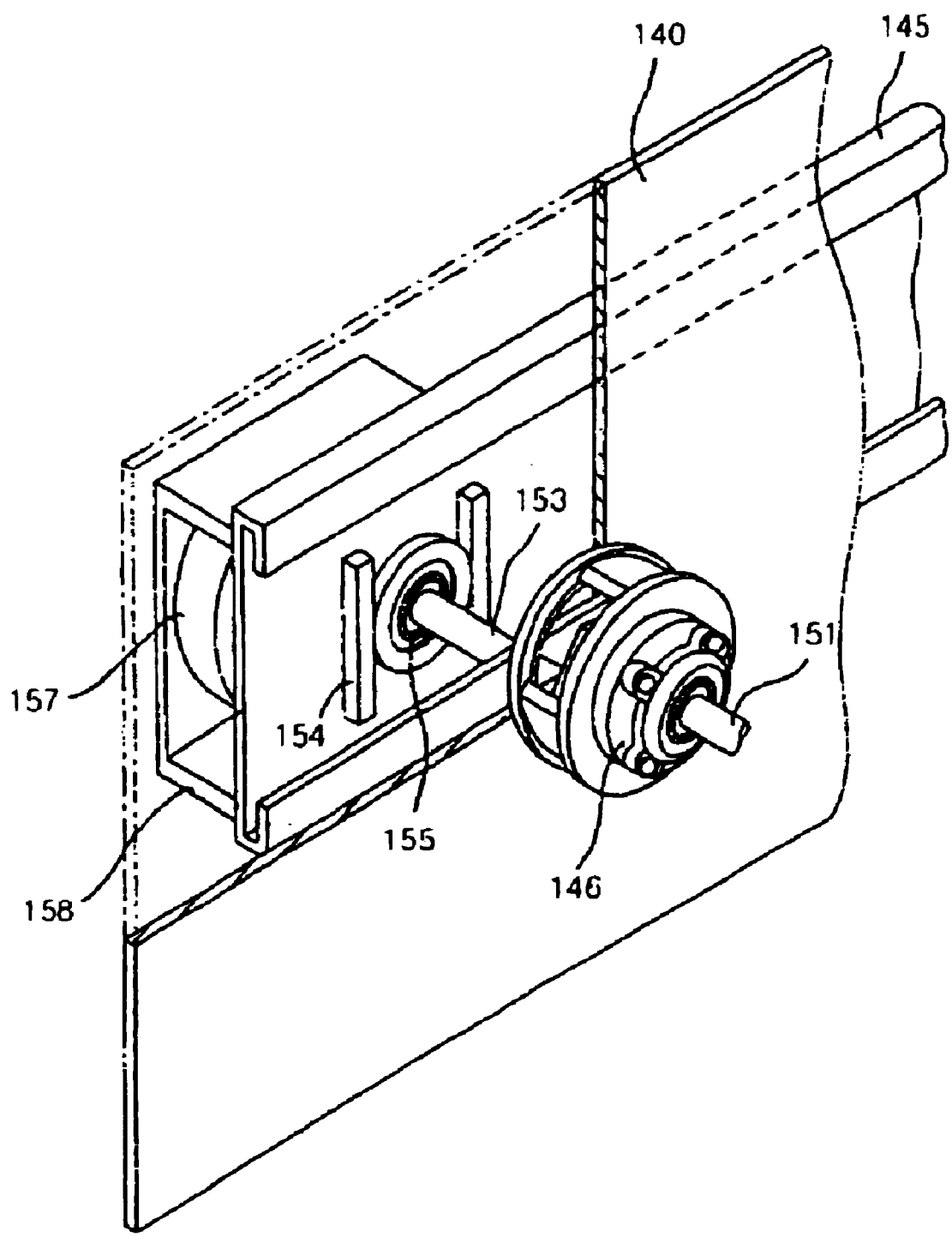
FIG. 10 is a perspective view showing the essential parts of the elliptic motion driving unit of the present invention.
Figure 11:
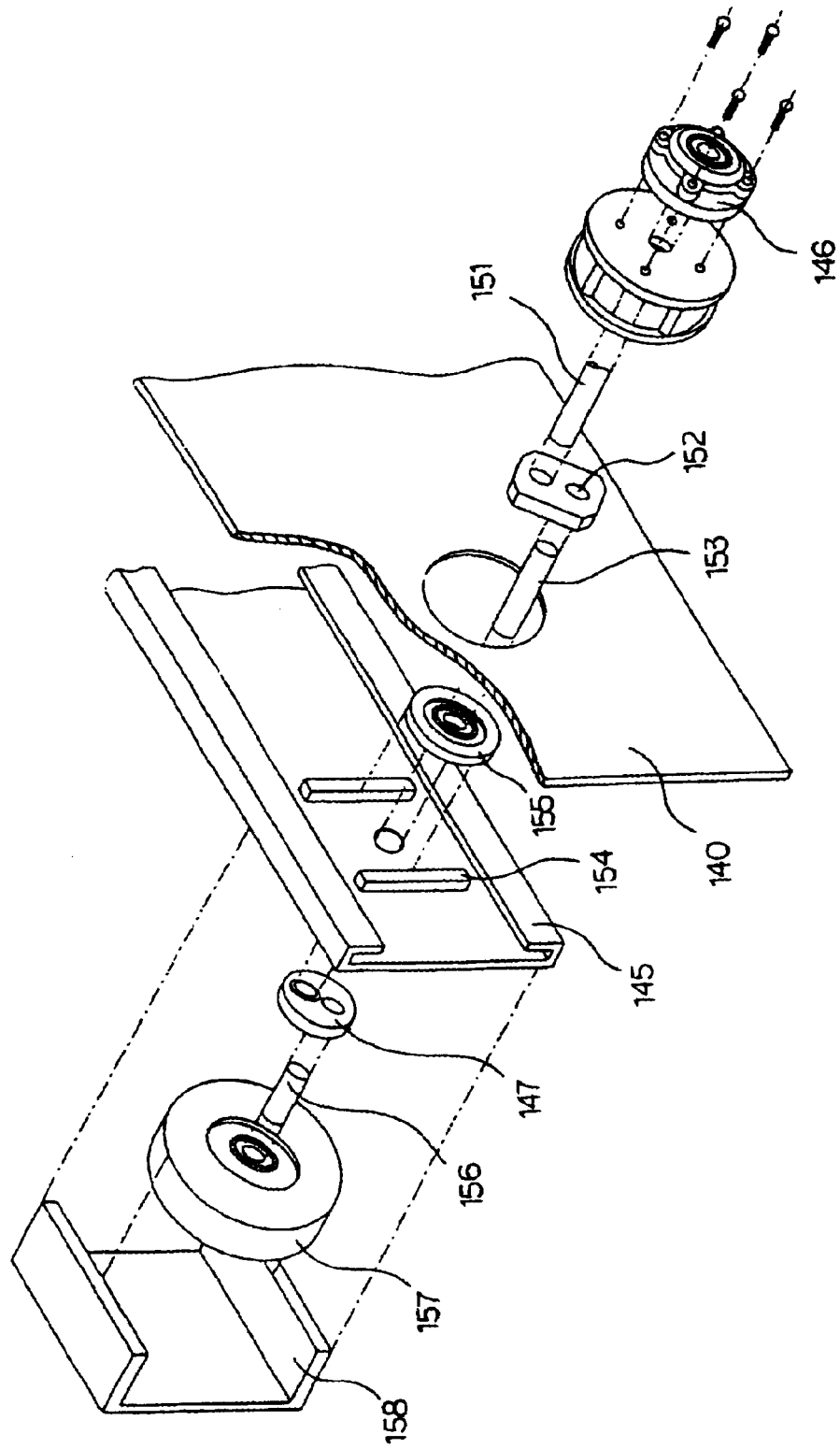
FIG. 11 is an exploded perspective view showing the elliptic motion driving unit of the present invention.

FIG. 8 shows overall the external appearance of the step screen in which steep-toothed movable plates 120 are mounted according to the present invention, FIGS. 9, 10 and 11 respectively show the power transmission structure of an elliptic motion driving unit 150 mounted at an upper portion of the screen so as to make the steep-toothed movable plates 120 move elliptically and the external structure of the elliptic motion driving unit 150 in assembled and disassembled states.

Figure 12:
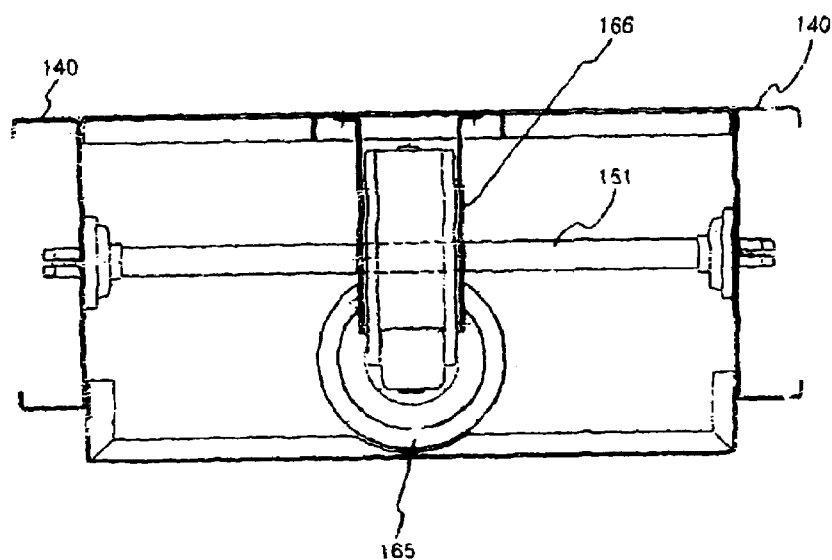
FIG. 12 is a sectional view showing a driving motor and a warm reduction gear used to operate the elliptic motion driving unit of the present invention.

As shown in the figures, the optical motion driving apparatus of the present invention is installed to a steep-toothed step screen. This elliptic motion driving apparatus has movable plates 120 which has a plurality of toothed steps 121 with an inclination of more than 45°. The elliptic motion driving apparatus is designed to push upward and convey impurities in wastewater while the movable plates 120 perform elliptical movements without inclination less than a horizontal level. In this point, the apparatus includes a driving rotation cam 152 whose one end is connected to a power transmission shaft 151, which is connected to and rotated by a warm reduction gear 146 of a driving motor 165 as shown in FIG. 12. A horizontal eccentric bearing 155 of an eccentric shaft 153 for horizontal motion is axially combined to the other end of the driving rotation cam 152. Thus, as the driving rotation cam 152 rotates, a horizontal eccentric bearing 155 of the eccentric shaft 153 for horizontal motion can move horizontally along a horizontal motion guiding rail 154. An eccentric shaft 156 for vertical motion is combined to the eccentric shaft 153 for horizontal motion through a mediate eccentric rotation cam 147. Thus, as the eccentric shaft 153 for horizontal motion rotates, a vertical eccentric bearing of the eccentric shaft 156 for vertical motion can move vertically along a vertical motion guiding rail 158.

The circular motion is transferred from the power transmission shaft 151 of the driving motor 165 installed to the upper portion of the screen. This circular motion is combined with the horizontal motion of the horizontal eccentric bearing 155 and the vertical motion of the vertical eccentric bearing 157 so that the movable column 145 combined with the steep-toothed movable plates 120 may move elliptically. These elements realizing the elliptic motion of the movable column 145 are generally named for the elliptic motion driving unit 150. The elliptic motion of the movable column 145 connected to the elliptic motion driving unit 150 is reproduced through a plurality of links 163 so that the movable plates 120 may perform regular elliptic motion as a whole to a longitudinal direction of the movable column 145 together with the movable column 145. Such elements driven by the driving unit 150 are called a driven link 160. The steep-toothed movable plates 120 are thus moved elliptically while being inclined upward from a horizontal surface of the aqueduct bottom by the driven link 160, so the plates 120 may push upward impurities in wastewater securely.

In other words, the elliptic motion driving unit 150 generates an elliptical motion by combining horizontal and vertical motions thereby making the movable column 145 and even the movable plates 120 move elliptically.

The elliptic motion driving unit 150 facilitates the movable plates 120, which are arranged with a regular interval together with the stationary plates 130 between both fixed frames 140, to perform elliptical movement so that impurities in wastewater may be carried upward and removed. Thus, the driving rotation cam 125 is, at one end, combined to the power transmission shaft 151 which rotates in linkage with the warm reduction gear 166 of the driving motor 165. At this time, the combined end of the power transmission shaft 151 is inserted into a shaft support 146 fastened with a bolt to the fixed frame 140 and then screwed to one side of the driving rotation cam 152. The eccentric shaft 153 for horizontal motion is axially combined to the other end of the driving rotation cam 152. Thus, while the eccentric rotation of the driving rotation cam 152 is transferred to the eccentric shaft 153 for horizontal motion, the horizontal eccentric bearing 155 combined to the eccentric shaft 153 for horizontal motion can be moved horizontally through the grooves 159 along the horizontal motion guiding rail 154.

The eccentric shaft 156 for vertical motion is combined to the eccentric shaft 153 for horizontal motion through the mediate eccentric rotation cam 147. Thus, as the eccentric shaft 153 for horizontal motion rotates, the vertical eccentric bearing 157 of the eccentric shaft 156 for vertical motion can move vertically along the vertical motion guiding rail 158. The elliptic motion driving unit including the eccentric shafts 153, 156 for horizontal and vertical motions is exposed out of the fixed frame 140 through a driving unit piercing portion 144 so as to be combined with the movable column 145. Thus, when the horizontal motion of the horizontal eccentric bearing 155 is combined with the vertical motion of the vertical eccentric bearing 157, the movable column 145 may move elliptically together with the steep-toothed movable plates 120 connected thereto.

The driven link 160 reproduces the elliptic motion of the elliptic motion driving unit 159 so that the movable plates 120 may move elliptically in a longitudinal direction of the movable column 145 together with the movable column 145. A fixed flange 141 is integrally combined to the fixed frame 140, and a link support 169 is integrally combined to the movable column 145. Between the fixed flange 141 and the link support 169, link arms 164, 167 are pivotally combined, respectively. Both link arms 164, 167 are also pivotally combined with each other through a link casing 168 and thus pivotally combined to a column connector 124 of the movable plate 120. There are also a plurality of links 163 which make the link casing 168 move straight when the both link arms 164, 167 rotate.

Figure 15:
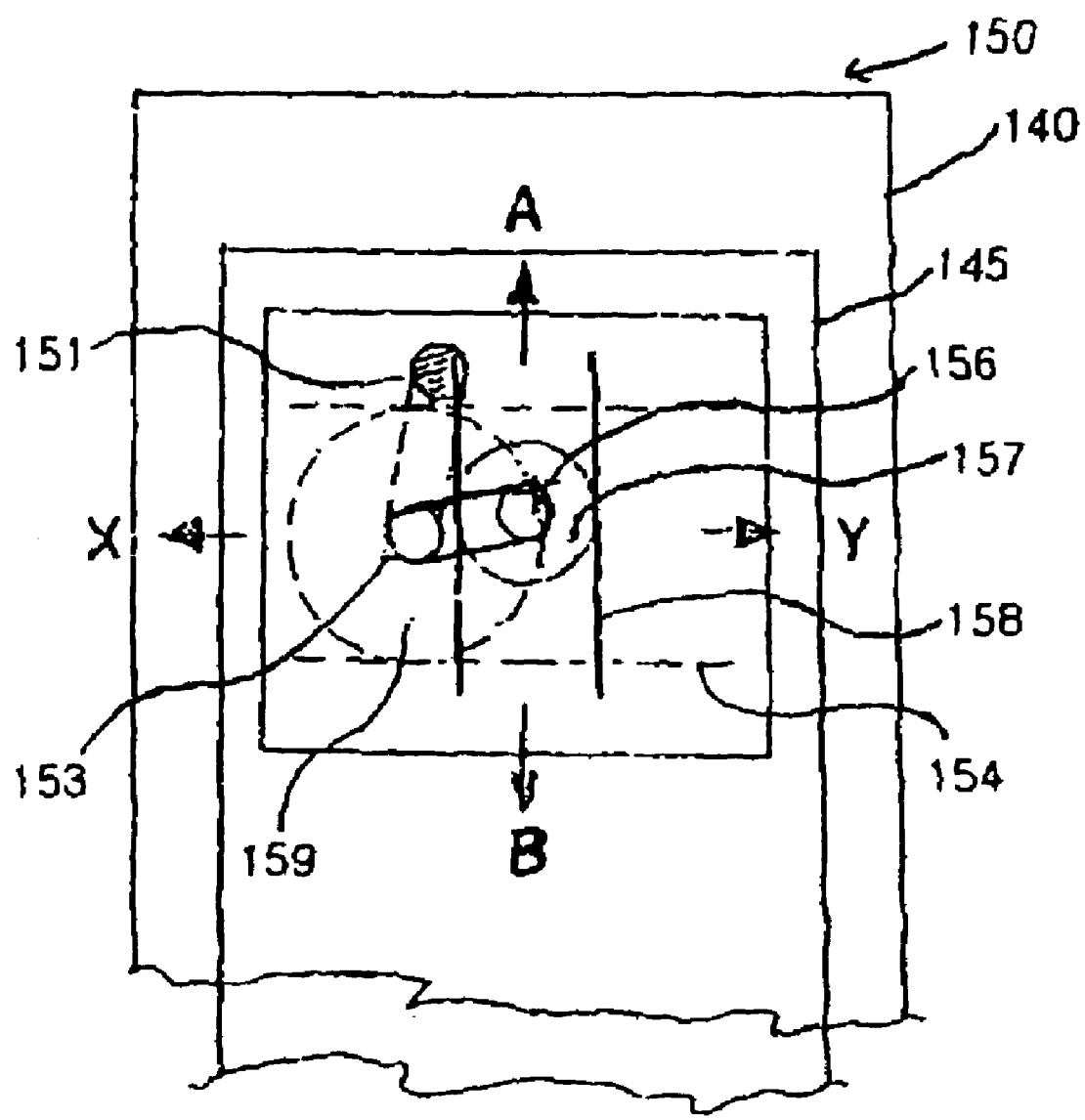
FIG. 15 is a schematic view illustrating operation of the elliptic motion driving unit according to the present invention.
Figure 16:
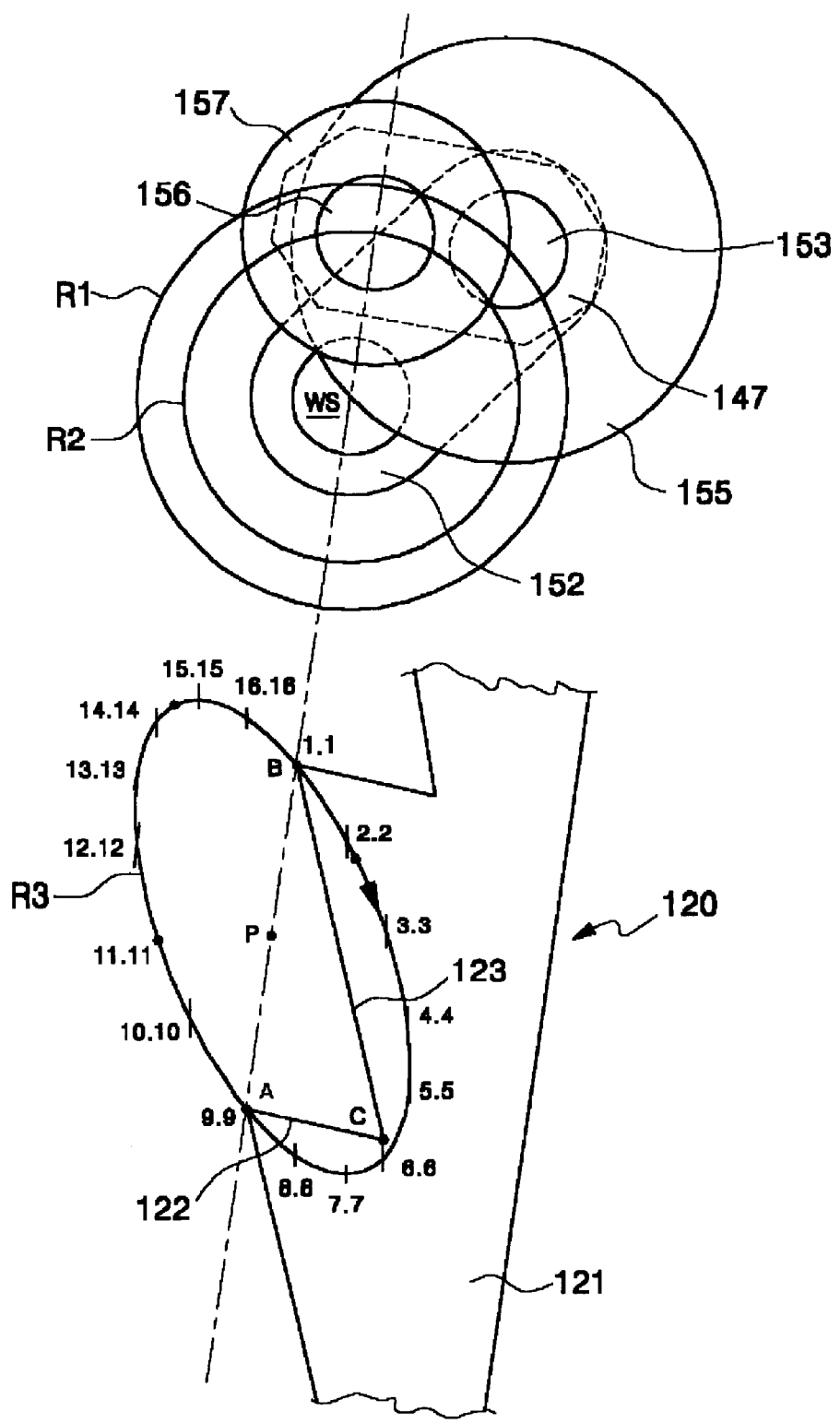
FIG. 16 is for illustrating a principle of the elliptic motion of the movable plate derived from the elliptic motion driving unit of the present invention.

As described above, the elliptic motion driving apparatus of a steep-toothed step screen according to the present invention enables the movable plates 120 to elliptically move as a whole together with the movable column 145 while the elliptic motion driving unit 150 operates the movable column 145 to move elliptically. This would be better understood with reference to FIG. 15 showing the schematic operational structure of the elliptic motion driving unit 150 of the present invention and FIG. 16 showing an elliptical orbit of the movable plate 120 driven by the elliptic motion driving unit 150 of the present invention. As shown in the figures, as the circular motion transferred from the power transmission shaft 151 of the driving motor 165 is compounded with the horizontal motion conducted by the horizontal eccentric bearing 155 along the horizontal motion guiding rail 154 and the vertical motion conducted by the vertical eccentric bearing 157 along the vertical motion guiding rail 158 of the elliptic motion driving unit 150, the steeptoothed movable plates 120 can move elliptically together with the movable column 145.

Figure 13:
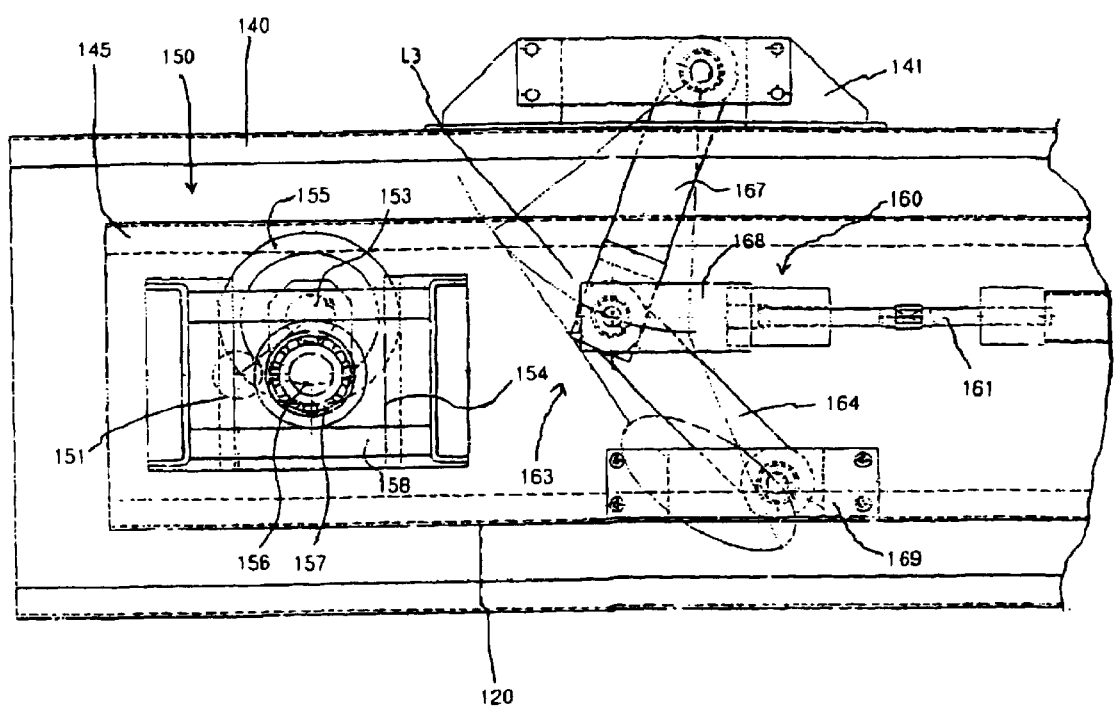
FIG. 13 shows a functional structure where the elliptic motion driving unit and a movable column linked to the elliptic motion driving unit of the steeptoothed step screen is elliptically moved so as to make the movable plates inside the fixed frames elliptically move through the driven link as a whole.
Figure 14A:
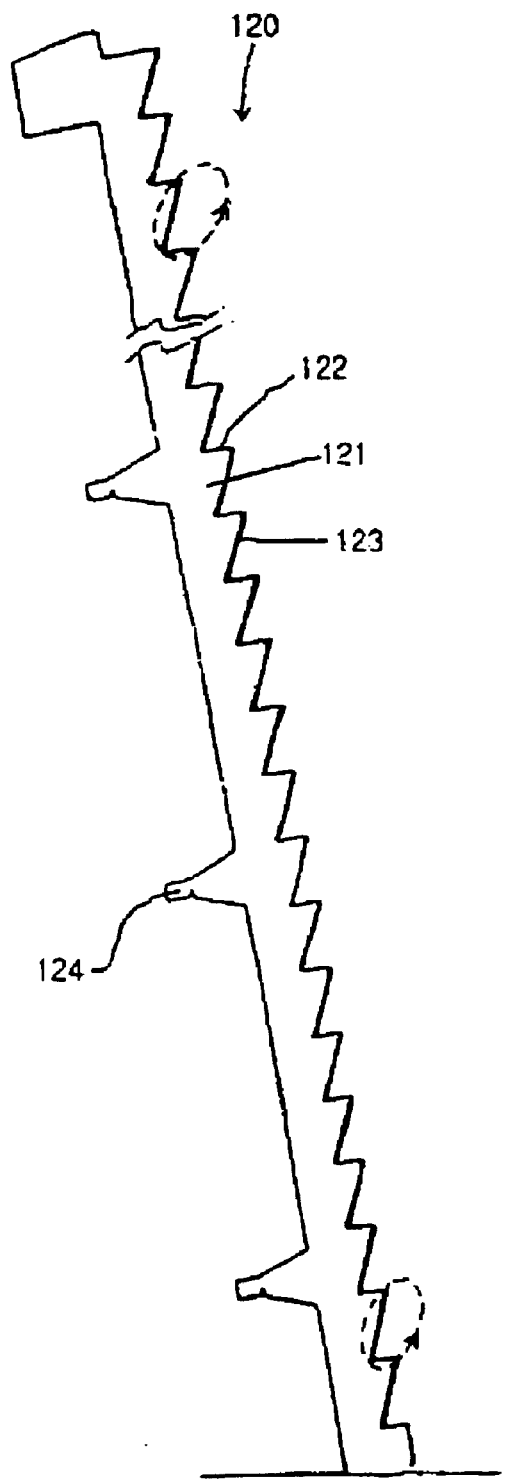
FIG. 14A is a sectional view of the steep-toothed movable plate applied to the step screen of the present invention.
Figure 14B:
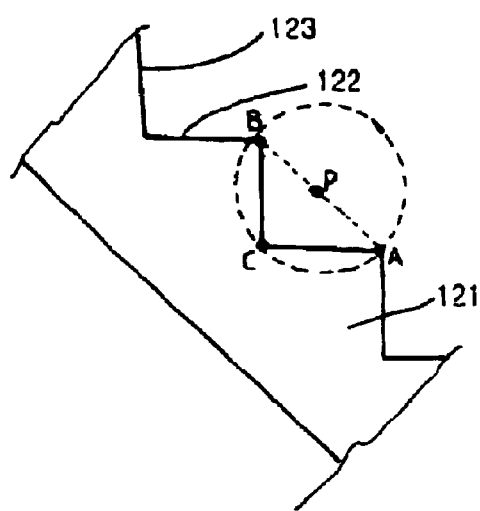
FIG. 14B is an enlarged view showing an area encircled by a dash line in FIG. 14A.

If the power transmission shaft 151 of the warm reduction gear 166 rotates by the drive force of the driving motor 165 of the elliptic motion driving unit 150, the driving rotation cam 152 rotates, and the eccentric shaft 153 for horizontal motion is also rotated. Then, the horizontal eccentric bearing 155 moves horizontally in a X-Y direction along the horizontal motion guiding rail 158, as shown in FIGS. 13 and 15. At the same time, the eccentric shaft 156 for vertical motion linked through the eccentric rotation cam 147 is also rotated, and the vertical eccentric bearing 157 is then moved vertically in a A-B direction along the vertical motion guiding rail 158. Then, owing to compound motions in horizontal and vertical directions, the elliptic motion driving unit 159 makes the movable column 145 move in an elliptical orbit. As understood from the elliptical orbit of the movable plate 120 shown in FIG. 16, a large circular orbit RI is a rotation of the eccentric shaft 153 for horizontal motion, while a small circular orbit R2 is a rotation of the eccentric shaft 156 for vertical motion. An elliptic orbit R3 is a combined result of the large circular orbit RI and the small circular orbit R2. This elliptic orbit R3 is a result from the elliptic motion of the movable plate 120 together with the movable column 145. Additionally, this elliptic orbit passes near points A, B and C on the basis of point P which is the center of points A and B between two toothed steps of the movable plate 120. Thus, impurities pulled up on a step surface 122 near the point C of the movable plate 120 under the elliptic motion can be easily transferred near point B of the terrace portion 122 of the step.

As described above, the elliptic motion driving apparatus of a step screen according to the present invention, in which the surface of each toothed step maintains an inclination of over 45° even when the screen is installed at a steep inclination more than 45°, thus enabling the movable plates having such toothed steps to elliptically move thereby pushing upward and move impurities in wastewater in a stable manner.

In addition, since the elliptic motion driving unit makes the movable plates perform elliptical movement regularly to a longitudinal direction of the movable column by means of the driven link installed longitudinally, the impurities pushed up onto the terrace portion of each step of the stationary plates can be stably moved upward though the movable plates and the stationary plates which are inclined steeply.

Thus, by using the present invention, the step screen can be installed in a deep wastewater aqueduct with an inclination of more than 45° even nearing 90°. Therefore, the present invention is advantageous in view of simple alternation without structural change of the aqueduct and reduced space for installation.

What is claimed is:

1. An elliptic motion driving apparatus for a step screen in which elliptic motion of an elliptic motion driving unit is transferred to a driven link so as to make a plurality of movable plates, connected by a movable column, perform an elliptical movement in a longitudinal direction of the movable column, the apparatus comprising:

a worm reduction gear which is driven by a drive motor for driving a power transmission;

a driving rotation cam having a first end coupled to said power transmission shaft and includes a second end;

a horizontal motion guiding rail;

a vertical motion guide rail;

an eccentric shaft for horizontal motion axially connected to said second end of said driving rotation cam, said eccentric shaft having a horizontal eccentric bearing for horizontal motion thereof which is movable horizontally along said horizontal motion guiding rail upon rotation of said driving rotation cam, said eccentric shaft having a vertical eccentric beating; and an eccentric shaft for vertical motion and an eccentric rotation cam mounted on said eccentric shaft for vertical motion and being engagable with said eccentric shaft for horizontal motion through said eccentric rotation cam such that said vertical eccentric bearing of the eccentric shaft for vertical motion moves vertically along said vertical motion guiding rail upon rotation of said eccentric shaft for horizontal motion.

* * * * *